(12) United States Patent
Li (10) Patent No.: US 11,864,503 B2
(45) Date of Patent: Jan. 9, 2024

(54) MULTIFUNCTIONAL AUTOMATIC TRANSLATIONAL FIELD SERVICE EQUIPMENT

(71) Applicant: Jinpo Li, Henan (CN)

(72) Inventor: Jinpo Li, Henan (CN)

(73) Assignee: Jinpo Li, Henan (CN)

( * ) Notice: Subject to any disclaimer, the term of this patent is extended or adjusted under 35 U.S.C. 154(b) by 822 days.

(21) Appl. No.: 16/961,694

(22) PCT Filed: Jan. 11, 2019

(86) PCT No.: PCT/CN2019/071408
§ 371 (c)(1),
(2) Date: Apr. 9, 2021

(87) PCT Pub. No.: WO2019/137488
PCT Pub. Date: Jul. 18, 2019

(65) Prior Publication Data
US 2021/0274730 A1    Sep. 9, 2021

(30) Foreign Application Priority Data
Jan. 11, 2018 (CN) .......................... 201820042158.9

(51) Int. Cl.
*A01G 25/09* (2006.01)
(52) U.S. Cl.
CPC .................................. *A01G 25/09* (2013.01)
(58) Field of Classification Search
CPC .................................. A01G 25/09; A01M 7/00
USPC ........................................ 239/723, 726, 743
See application file for complete search history.

(56) References Cited

U.S. PATENT DOCUMENTS

| 2,889,948 | A | * | 6/1959 | Leuenberger | A01G 25/09 414/800 |
| 3,237,867 | A | * | 3/1966 | Hogg | A01G 25/09 239/734 |
| 2011/0127344 | A1 | * | 6/2011 | Korus | A01G 25/095 239/723 |
| 2012/0286076 | A1 | * | 11/2012 | Korus | F16L 35/00 239/743 |

FOREIGN PATENT DOCUMENTS

| CN | 201766917 U | 3/2011 |
| CN | 103392563 A | 11/2013 |
| CN | 103814797 A | 5/2014 |
| CN | 205756121 U | 12/2016 |
| CN | 207897577 U | 9/2018 |
| JP | H11206253 A | 8/1999 |

* cited by examiner

*Primary Examiner* — Jason J Boeckmann
(74) *Attorney, Agent, or Firm* — Gang Yu (57) ABSTRACT

Some embodiments of the present disclosure provide a multi-functional automatic translational field service device, which includes a first driverless water wagon and a second driverless water wagon that are arranged on a flat road at two ends of a field respectively. The first driverless water wagon is connected with the second driverless water wagon through a first steel wire (1) and a second steel wire (2), and two sides of the first steel wire (1) are each provided with a synchronizer (3); the first steel wire (1) is connected with a first horizontal PVC pipe (5) through a plurality of third steel wires (4) that are evenly distributed and extended along a vertical direction; a plurality of first round holes are evenly distributed on the first PVC pipe (5).

10 Claims, 7 Drawing Sheets

MULTIFUNCTIONAL AUTOMATIC TRANSLATIONAL FIELD SERVICE EQUIPMENT

CROSS-REFERENCE TO RELATED APPLICATIONS

The present disclosure is a national stage application of International Patent Application No. PCT/CN2019/071408, which is filed on Jan. 11, 2019, and claims priority to Chinese Patent Application No. 201820042158.9, filed on Jan. 11, 2018 and entitled "Multi-functional Automatic Translational Field Service Device", the contents of which are hereby incorporated by reference in its entirety.

TECHNICAL FIELD

The disclosure relates to a technical field of ground pouring devices, in particular to a multi-functional automatic translational field service device.

BACKGROUND

In recent years, large-scale droughts across the country have caused losses almost every year in summer to people including large land contractors, and caused considerable economic losses to the country and farmers.

The traditional sprinkler mainly includes a translational sprinkler and a winch sprinkler. The translational sprinkler is to build a cement ditch at one end of the field, pump water from a well into the cement ditch, and pump the water from the ditch into a sprinkling pipe with a plurality of small holes in an overhead support. The overhead support is supported by three to five rows powered wheels, each row of the three to five rows powered wheels includes two powered wheels. The translation is driven by a motor reducer to move slowly. The winch sprinkler is to drive a support mounted on two wheels by water in a PE pipe, implement sprinkling by moving a spray gun forward and backward in the field, and deliver the well water to a winch standing at one end of the field for intelligently telescoping the PE pipe.

The above two sprinklers will cause losses due to the crushing of crops by the wheels during sprinkling. The winch is difficult to spray evenly and is not suitable for high-stalk crop spraying. Both have a single function and can only irrigate the field and spray drugs.

SUMMARY

In view of the above technical problems in the related art, the disclosure proposes a multi-functional automatic translational field service device, which can overcome the above shortcomings of the conventional art.

To achieve the above technical objective, the technical solution of the disclosure is implemented as follows.

Some embodiments of the present disclosure provide a multi-functional automatic translational field service device which includes a first driverless water wagon and a second driverless water wagon that are arranged on a flat road at two ends of a field respectively. The first driverless water wagon is connected with the second driverless water wagon through a first steel wire and a second steel wire. Two sides of the first steel wire are each provided with a synchronizer. The first steel wire is connected with a first horizontal PVC pipe through a plurality of third steel wires that are evenly distributed and extended along a vertical direction. A plurality of first round holes are evenly distributed on the first PVC pipe. The second steel wire is connected with a second horizontal PVC pipe through a plurality of fourth steel wires that are evenly distributed and extended along the vertical direction. A plurality of second round holes are evenly distributed on the second PVC pipe. Each of the first driverless water wagon and the second driverless water wagon both include a water wagon chassis. The water wagon chassis is provided with a hydraulic oil tank, a balancer, a water storage tank and a first support respectively. A hydraulic motor is connected with the hydraulic oil tank. One side of the first support is connected with a counterweight water tank through a pulling water tank steel wire. The water storage tank is disposed on the other side of the first support. The water wagon chassis is provided with a distribution box. The water wagon chassis is provided with an overhead aluminum wire on one side of the counterweight water tank. Both ends of the overhead aluminum wire are connected with wire rods through overhead aluminum wire supports. A wiping overhead wire support assembly is connected with the overhead aluminum wire. The wiping overhead wire support assembly is connected with the distribution box through a first cable. The distribution box on the first driverless water wagon is connected with the distribution box on the second driverless water wagon through a second cable. An end of the overhead aluminum wire on a side of the second driverless water wagon is connected with a first water pump in a well through a water pump wire. The first water pump is connected with the water storage tank on the second driverless water wagon through a water inlet pipe. A front side of the water storage tank on the second driverless water wagon is connected with a second water pump. An upper end of the second water pump is connected with a first valve and a second valve respectively; the first valve is connected with the PVC pipe I, and the second valve is connected with the second PVC pipe. A front end and a rear end of the water wagon chassis on the second driverless water wagon are connected with a valve switch manipulator through a manipulator support. The front end and the rear end of one side of the second driverless water wagon both are connected with a travel switch through a travel switch support.

In some embodiments, the valve switch manipulator includes a base. A first motor is mounted on the base. A first gear on the first motor is connected with a first platform through a first rack. A plurality of first bearings are disposed at the connection between the first platform and the base. A second motor is mounted on the first platform. A second gear on the second motor is connected with a second platform through a second rack. A plurality of second bearings are disposed at a connection between the second platform and the first platform. A rotating motor is mounted on the second platform through a rotating motor support. One side of the rotating motor is connected with a third rack through a first iron block. The third rack is connected with a third motor through a third gear. The other side of the rotating motor is connected with a sliding block on a track through a second iron block. Four positioning metal sensors are evenly mounted on the second platform along the circumference of the rotating motor. A rotor of the rotating motor is connected with a manipulator finger. A downward limit proximity switch is mounted on one side of the manipulator finger. An induced iron bar is mounted on the other side of the manipulator finger. Both a left side and a front side of the rotating motor are provided with a limit sensor. The limit sensor is mounted on the second platform through a limit sensor support.

In some embodiments, the first support is connected to a second support through a third support. A pulling motor is disposed in the middle of the second support. An electromagnetic clutch is disposed on the pulling motor. A hoist is disposed on a top of the second support.

In some embodiments, the water wagon chassis includes a plurality of front axles and a differential. Both left and right ends of each front axle in the plurality of front axles are provided with a first wheel. The each front axle is connected with a steering rod of a steering hydraulic cylinder. The differential is connected with a hydraulic motor through a transmission shaft. Both left and right ends of the differential are provided with a plurality of second wheels. The second wheels on the left and right sides of the differential are connected with a brake pull rod of a brake hydraulic cylinder. Upper and lower sides of the water wagon chassis are provided with a steering travel switch respectively.

In some embodiments, a dryer is disposed between a pulling motor on the first driverless water wagon and a pulling motor on the second driverless water wagon, a plurality of steel wires penetrate through an upper end of the dryer, one end of each steel wire is connected with the hoist on the first driverless water wagon, the other end of the steel wire is connected with the hoist on the first driverless water wagon, the dryer is connected with the distribution box through a third cable, and the dryer includes tungsten wires evenly distributed and extended vertically and a plurality of rows of dryer fans evenly distributed.

In some embodiments, the dryer is replaced with a hanging basket or a rain shelter, the rain shelter includes a reinforcing mesh support, the reinforcing mesh support is provided with a film, a sunscreen is disposed above the film, and two upper ends of the reinforcing mesh support are provided with a connecting ring respectively.

In some embodiments, the water wagon chassis is also provided with a counterweight iron plate, and there are two front axles and two second wheels.

In some embodiments, the synchronizer includes an insulating plastic sleeve, an outer side of the insulating plastic sleeve is sleeved with a conductive copper tube, both sides of the conductive copper tube are provided with contactor copper sheets, the contactor copper sheet is connected with a plastic block through an first insulating screw, the plastic block is connected with a second steel pipe through an second insulating screw, and the contactor copper sheet is connected with the second steel pipe through a plastic screw.

In some embodiments, the hydraulic oil tank is provided with a hydraulic electromagnetic valve, a hydraulic oil pump, a motor, and a motor oil pump respectively, and the hydraulic oil pump is connected with the motor.

In some embodiments, the balancer includes a proximity switch, a first steel pipe is sleeved in the middle of the proximity switch, the first steel pipe is provided with a steel ball, and a lower part of the first steel pipe is provided with a plurality of screws.

The beneficial effects of the disclosure are as follows: the disclosure can effectively reduce and avoid economic losses caused by a natural environment, and can also effectively reduce labor and labor intensity, save costs, and increase economic income. The multi-functional automatic translational field service device of disclosure has a high degree of automation, multi-functionality and simple operation.

BRIEF DESCRIPTION OF THE DRAWINGS

In order to more clearly illustrate the embodiments of the disclosure or the technical solutions in the conventional art, the drawings used in the embodiments will be briefly described below. It is apparent that the drawings in the following description are only some embodiments of the disclosure, and other drawings may be obtained from those skilled in the art according to these drawings without any creative work.

In the drawings.

1, first steel wire; 2, second steel wire; 3, synchronizer; 4, third steel wire; 5, first PVC pipe; 6, fourth steel wire; 7, second PVC pipe; 8, front axle; 9, differential; 10, first wheel; 11, steering hydraulic cylinder; 12, steering rod; 13, transmission shaft; 14, hydraulic motor; 15, second wheel; 16, brake hydraulic cylinder; 17, brake pull rod; 18, steering travel switch; 19, water storage tank; 20, second support; 21, pulling motor; 22, hoist; 23, electromagnetic clutch; 24, third support; 25, first support; 26, counterweight water tank; 27, counterweight iron plate; 28, distribution box; 29, overhead aluminum wire; 30, overhead aluminum wire support; 31, wire rod; 32, wiping overhead wire support assembly; 33, second cable; 34, water pump wire; 35, well; 36, water inlet pipe; 37, manipulator support; 38, valve switch manipulator; 39, first motor; 40, first rack; 41, second water pump; 42, first valve; 43, second valve; 44, insulating plastic sleeve; 45, conductive copper tube; 46, contactor copper sheet; 47, first insulating screw; 48, plastic block; 49, second insulating screw; 50, plastic screw; 51, first gear; 52, first bearing; 53, hydraulic oil tank; 54, balancer; 55, hydraulic electromagnetic valve; 56, hydraulic oil pump; 57, motor; 58, limit sensor support; 59, tungsten wire; 60, dryer fan; 61, reinforcing mesh support; 62, film; 63, sunscreen; 64, connecting ring; 65, proximity switch; 66, first steel pipe; 67, steel ball; 68, screw; 69, motor oil pump; 70, second steel pipe; 71, third cable; 72, pulling water tank steel wire; 73, second motor; 74, second gear; 75, second rack; 76, second bearing; 77, rotating motor; 78, third rack; 79, third gear; 80, third motor; 81, first iron block; 82, second iron block; 83, track; 84, sliding block; 85, rotating motor support; 86, positioning metal sensor; 87, manipulator finger; 88, downward limit proximity switch; 89, limit sensor; 90, cable winch; 91, travel switch; 92, travel switch support; 93, induced iron bar; 94, valve; 95, induced iron sheet.

DETAILED DESCRIPTION OF THE EMBODIMENTS

The technical solutions in the embodiments of the disclosure will be clearly and completely described hereinbelow with the drawings in the embodiments of the disclosure. It is apparent that the described embodiments are only part of the embodiments of the disclosure, not all of the embodiments. On the basis of the embodiments of the disclosure, all other embodiments obtained by those of ordinary skill in the art should fall within the scope of protection of the disclosure.

Figure 13:
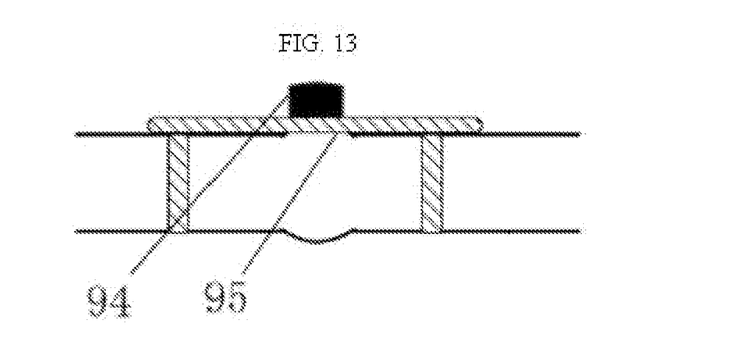
FIG. 13 illustrates a specific schematic structure diagram of a valve and an induced iron sheet according to an embodiment of the disclosure.

As shown in FIG. 1 to FIG. 12, a multi-functional automatic translational field service device according to an embodiment of the disclosure includes a first driverless water wagon and a second driverless water wagon that are arranged on a flat road at two ends of a field respectively. The first driverless water wagon is connected with the second driverless water wagon through a first steel wire 1 and a second steel wire 2. Two sides of the first steel wire 1 are each provided with a synchronizer 3. The first steel wire 1 is connected with a first horizontal PVC pipe 5 through a plurality of third steel wires 4 that are evenly distributed and extended along a vertical direction. A plurality of first round holes are evenly distributed on the first PVC pipe 5. The second steel wire 2 is connected with a second horizontal PVC pipe 7 through a plurality of fourth steel wires 6 that are evenly distributed and extended along the vertical direction. A plurality of second round holes are evenly distributed on the second PVC pipe 7. Each of the first driverless water wagon and the second driverless water wagon both include a water wagon chassis. The water wagon chassis is provided with a hydraulic oil tank 53, a balancer 54, a water storage tank 19 and a first support 25 respectively. A hydraulic motor 14 is connected with the hydraulic oil tank 53. One side of the first support 25 is connected with a counterweight water tank 26 through a pulling water tank steel wire. The water storage tank 19 is disposed on the other side of the first support 25. The water wagon chassis is provided with a distribution box 28. The water wagon chassis is provided with an overhead aluminum wire 29 on a side of the counterweight water tank 26. Both ends of the overhead aluminum wire 29 are connected with a wire rod 31 through an overhead aluminum wire supports 30 respectively. A wiping overhead wire support assembly 32 is connected with the overhead aluminum wire 29. The wiping overhead wire support assembly 32 is connected with the distribution box 28 through a first cable. The distribution box 28 on the first driverless water wagon is connected with the distribution box 28 on the second driverless water wagon through a second cable 33. an end of the overhead aluminum wire 29 on a side of the second driverless water wagon is connected with a first water pump in a well 35 through a water pump wire 34. The first water pump is connected with the water storage tank 19 on the second driverless water wagon through a water inlet pipe 36. A valve 94 is mounted at a water outlet of the water inlet pipe 36. An induced iron sheet 95 is mounted on the valve 94 (as shown in FIG. 13). A front side of the water storage tank 19 on the second driverless water wagon is connected with a second water pump 41. An upper end of the second water pump 41 is connected with a first valve 42 and a second valve 43 respectively. The first valve 41 is connected with the first PVC pipe 5, and the second valve 43 is connected with the second PVC pipe 7. A front end and a rear end of the water wagon chassis on the second driverless water wagon are connected with a valve switch manipulator 38 through a manipulator support 37. The front end and the rear end of one side of the second driverless water wagon both are connected with a travel switch 91 through a travel switch support 92.

In a specific embodiment, the valve switch manipulator 38 includes a base. A first motor 39 is mounted on the base. A first gear 51 on the first motor 39 is connected with a first platform through a first rack 40. A plurality of first bearings 52 are disposed at the connection between the first platform and the base. A second motor 73 is mounted on the first platform. A second gear 74 on the second motor 73 is connected with a second platform through a second rack 75. A plurality of second bearings 76 are disposed at a connection between the second platform and the first platform. A rotating motor 77 is mounted on the second platform through a rotating motor support 85. One side of the rotating motor 77 is connected with a third rack 78 through a first iron block 81. The third rack 78 is connected with a third motor 80 through a third gear 79. The other side of the rotating motor 77 is connected with a sliding block 84 on a track 83 through a second iron block 82. Four positioning metal sensors 86 are evenly mounted on the second platform along the circumference of the rotating motor 77. A rotor of the rotating motor 77 is connected with a manipulator finger 87. A downward limit proximity switch 88 is mounted on one side of the manipulator finger 87. An induced iron bar 93 is mounted on the other side of the manipulator finger 87. Both a left side and a front side of the rotating motor 77 are provided with a limit sensor 89. The limit sensor 89 is mounted on the second platform through a limit sensor support 58.

Figure 3:
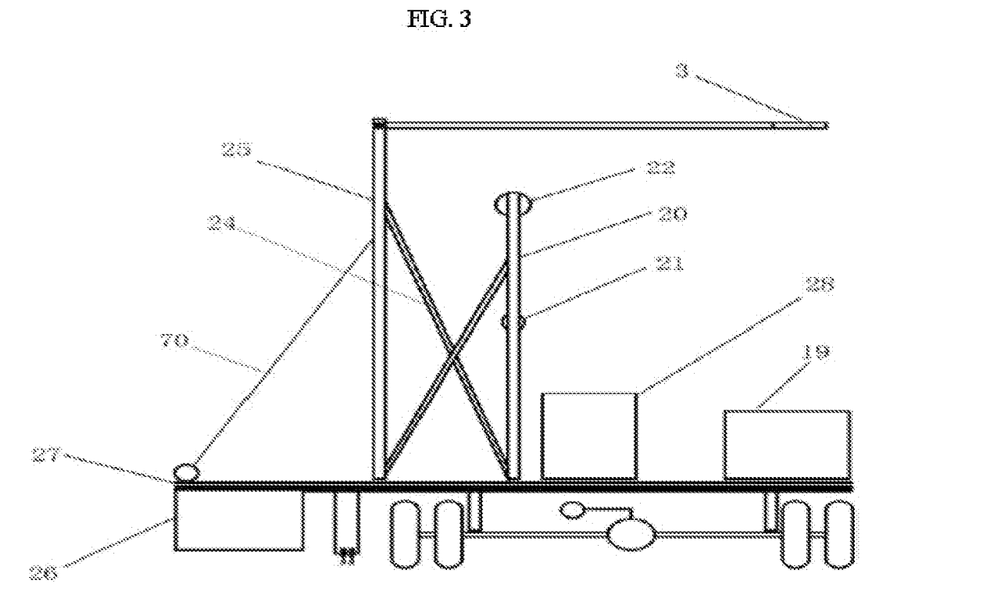
FIG. 3 illustrates a rear view of a first driverless water wagon according to an embodiment of the disclosure.
Figure 4:
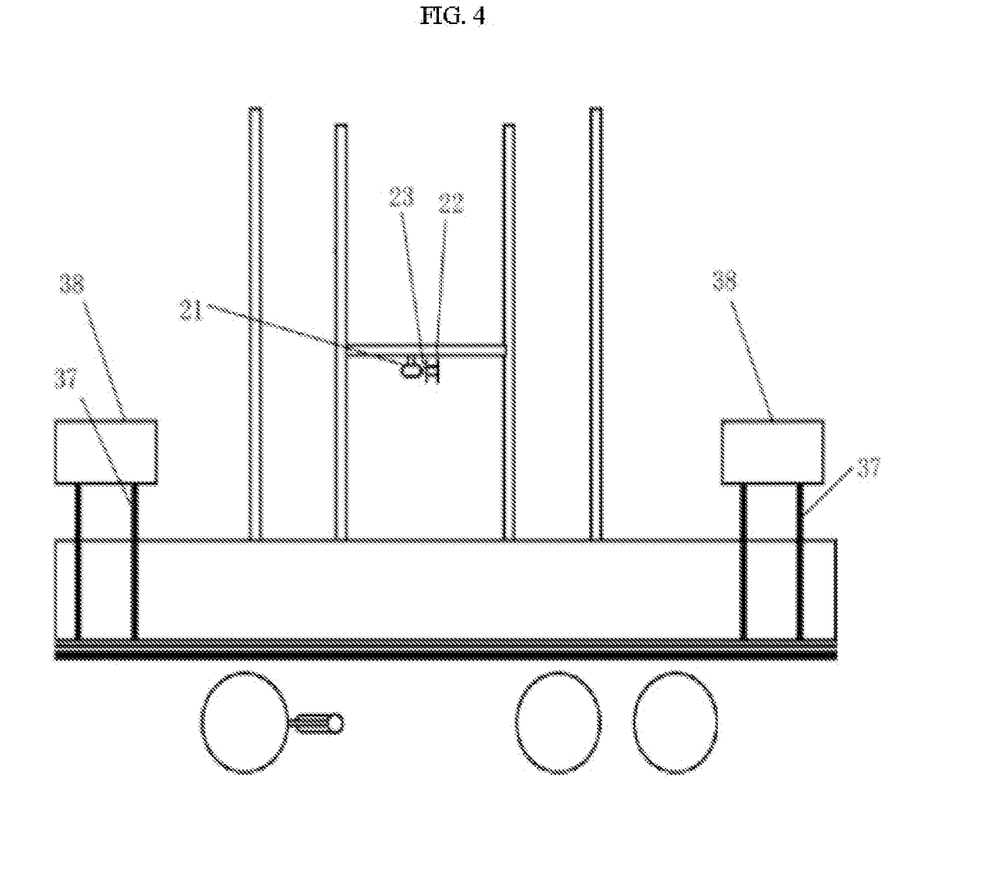
FIG. 4 illustrates a side view of a second driverless water wagon according to an embodiment of the disclosure.
Figure 5:
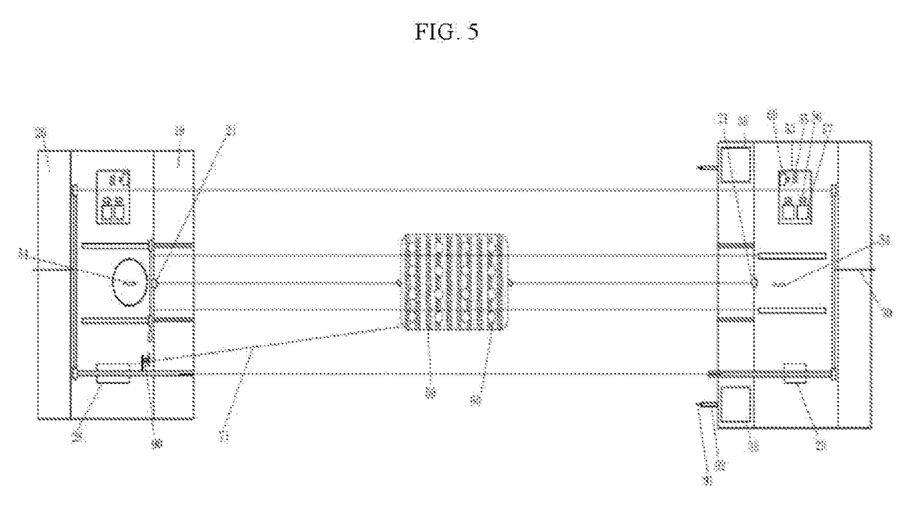
FIG. 5 illustrates a top view of a multi-functional automatic translational field service device according to an embodiment of the disclosure.

In a specific embodiment, the first support 25 is connected with a second support 20 through a third support 24. A pulling motor 21 is disposed in a middle of the second support 20. An electromagnetic clutch 23 is disposed on the pulling motor 21. A hoist 22 is disposed on a top of the second support 20.

Figure 1:
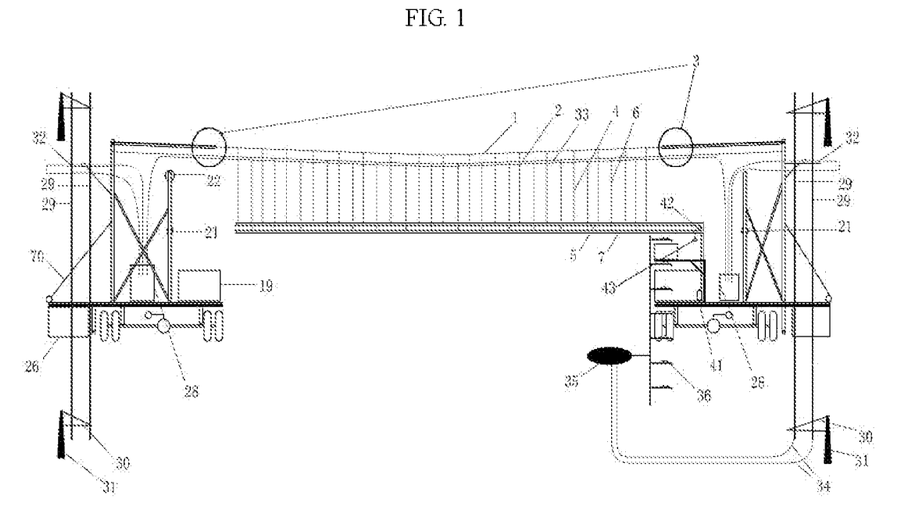
FIG. 1 illustrates an overall structure diagram of a multi-functional automatic translational field service device according to an embodiment of the disclosure.
Figure 2:
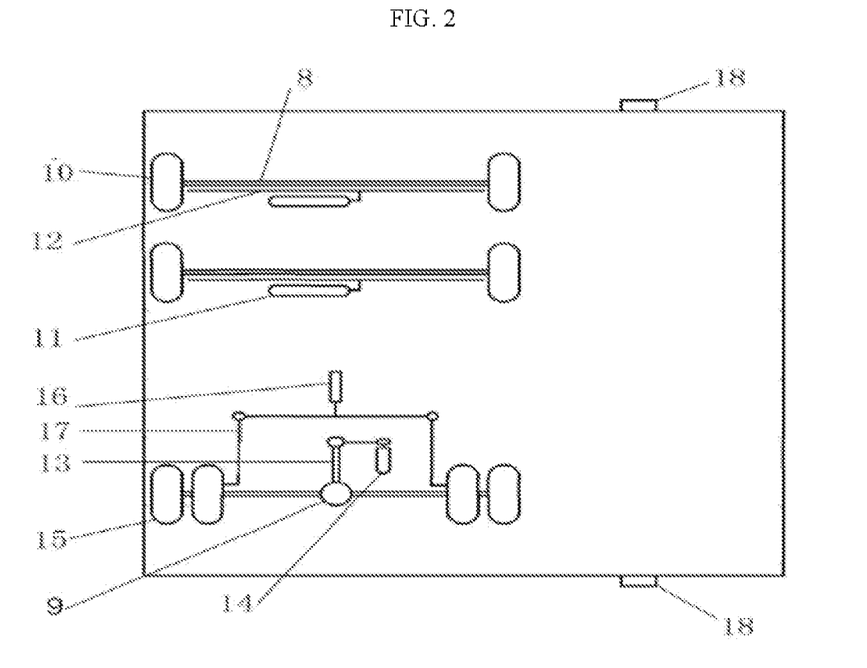
FIG. 2 illustrates a structure diagram of a water wagon chassis according to an embodiment of the disclosure.

In a specific embodiment, the water wagon chassis includes a plurality of front axles 8 and a differential 9. Both left and right ends of each front axle 8 in the plurality of front axles 8 are provided with a first wheel 10. The each front axle 8 is connected with a steering rod 12 of a steering hydraulic cylinder 11. The differential 9 is connected with a hydraulic motor 14 through a transmission shaft 13. Both left and right ends of the differential 9 are provided with a plurality of second wheels 15. The second wheels 15 on the left and right sides of the differential 9 are connected with a brake pull rod 17 of a brake hydraulic cylinder 16. Upper and lower sides of the water wagon chassis are provided with a steering travel switch 18 respectively.

In a specific embodiment, a dryer is arranged between the pulling motor 21 on the first driverless water wagon and a pulling motor 21 on the second driverless water wagon, a plurality of steel wires penetrate through an upper end of the dryer, one end of each steel wire is connected to the hoist 22 on the first driverless water wagon, the other end of the steel wire in the plurality of steel wires is connected with the hoist 22 on the first driverless water wagon, the dryer is connected with the distribution box 28 through a third cable 71 on a cable winch 90, and the dryer includes tungsten wires 59 evenly distributed and extended vertically and a plurality of rows of dryer fans 60 evenly distributed.

Figure 8:
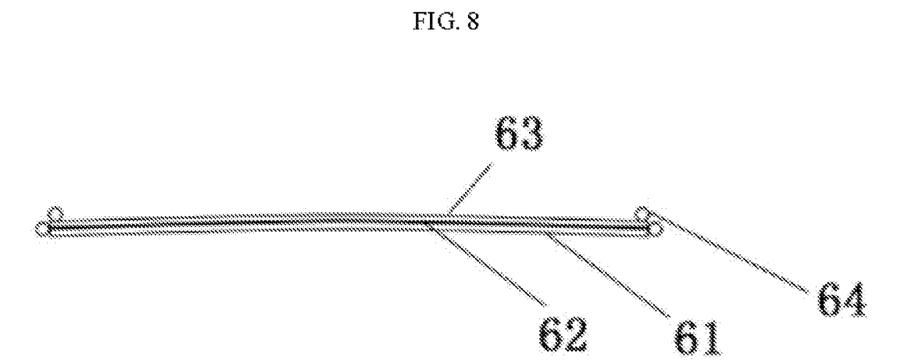
FIG. 8 illustrates a structure diagram of a rain shelter according to an embodiment of the disclosure.
Figure 9:
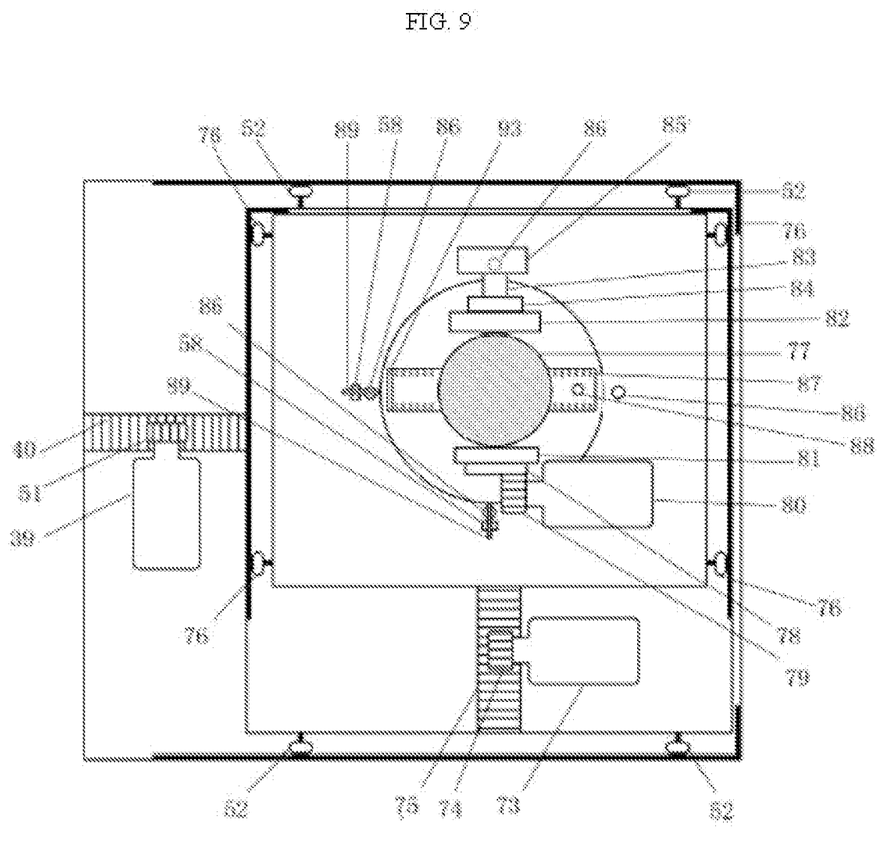
FIG. 9 illustrates a top view of a valve switch manipulator according to an embodiment of the disclosure.
Figure 10:
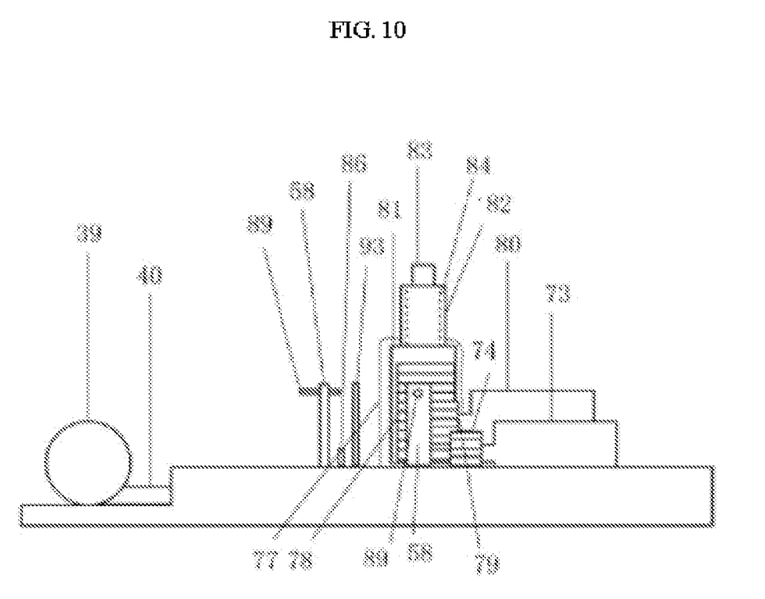
FIG. 10 illustrates a side view of a valve switch manipulator according to an embodiment of the disclosure.
Figure 11:
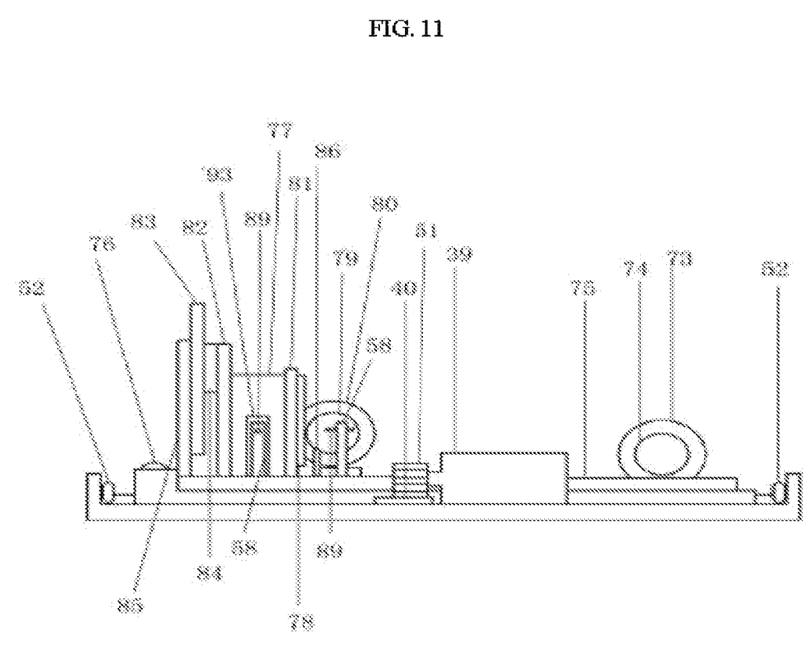
FIG. 11 illustrates a rear view of a valve switch manipulator according to an embodiment of the disclosure.
Figure 12:
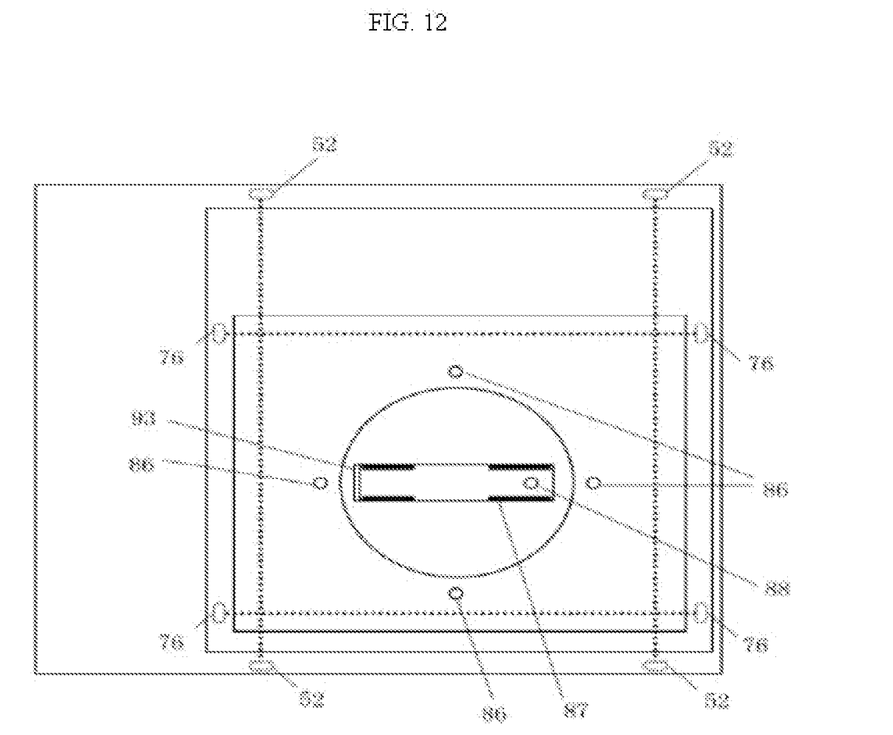
FIG. 12 illustrates a bottom view of a valve switch manipulator according to an embodiment of the disclosure.

In a specific embodiment, the dryer is replaced with a hanging basket or a rain shelter, the rain shelter includes a reinforcing mesh support 61, the reinforcing mesh support 61 is provided with a film 62, a sunscreen 63 is arranged above the film 62, and two upper ends of the reinforcing mesh support 61 are provided with a connecting ring 64 respectively.

In a specific embodiment, the water wagon chassis is also provided with a counterweight iron plate 27, and there are two front axles 8 and two second wheels 15.

Figure 6:
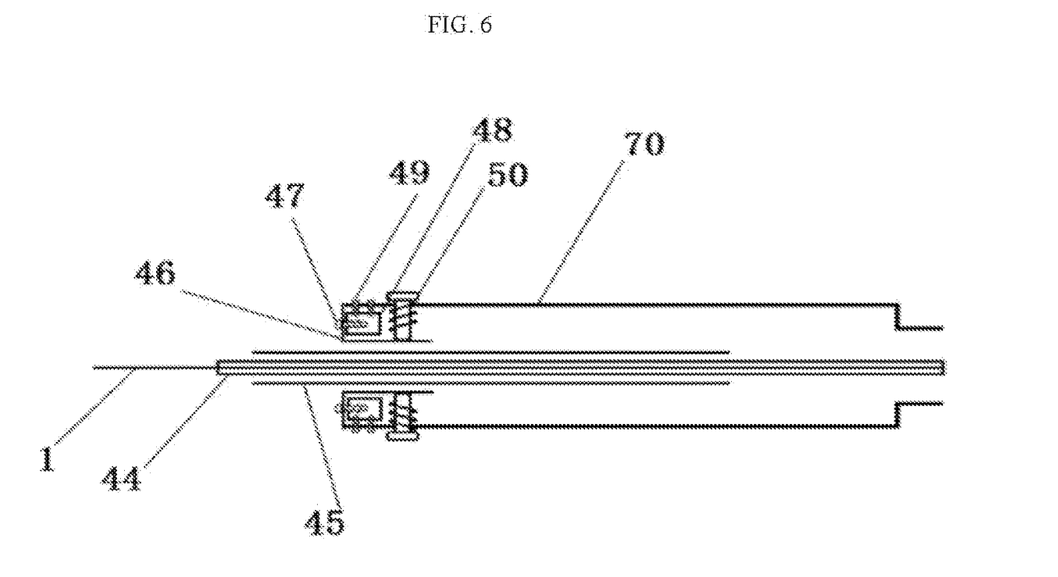
FIG. 6 illustrates a structure diagram of a synchronizer according to an embodiment of the disclosure.

In a specific embodiment, the synchronizer 3 includes an insulating plastic sleeve 44, an outer side of the insulating plastic sleeve 44 is sleeved with a conductive copper tube 45, both sides of the conductive copper tube 45 are provided with contactor copper sheets 46, the contactor copper sheet 46 is connected with a plastic block 48 through an first insulating screw 47, the plastic block 48 is connected with a second steel pipe 70 through an second insulating screw 49, and the contactor copper sheet 46 is connected with the second steel pipe 70 through a plastic screw 50.

In a specific embodiment, the hydraulic oil tank 53 is provided with a hydraulic electromagnetic valve 55, a hydraulic oil pump 56, a motor 57, and a motor oil pump 69 respectively, and the hydraulic oil pump 56 is connected with the motor 57.

Figure 7:
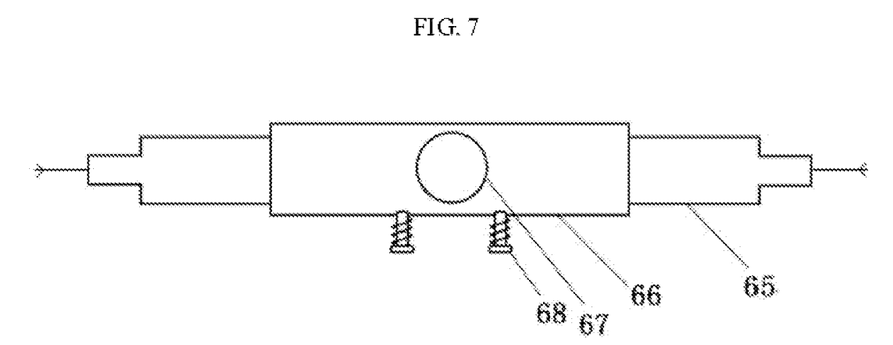
FIG. 7 illustrates a structure diagram of a balancer according to an embodiment of the disclosure.

In a specific embodiment, the balancer 54 includes a proximity switch 65, a first steel pipe 66 is sleeved in the middle of the proximity switch 65, the first steel pipe 66 is provided with a steel ball 67, and a lower part of the first steel pipe 66 is provided with a plurality of screw 68.

In order to facilitate the understanding of the above technical solutions of the disclosure, the above technical solutions of the disclosure will be described in detail below through specific usage modes.

In specific use, the main components of the disclosure are two driverless water wagons driven by hydraulic motors, which are suitable for a whole field of 100 to 300 acres and a field of 100 to 200 meters long. A 220V overhead aluminum wire is disposed at each end of the field. A deep water well is drilled at one end, and a smooth sand or cement road of about three meters is built at each end of the field. On the outside of the road, there is a two-millimeter-thick iron bar with a height of about six centimeters above the ground, which is used for two steering travel switches at the front and the rear of the water wagon. Two hydraulic water wagons are placed at each end of the field road. Two steel wire ropes with synchronizers are pulled from high altitude to prevent the two wagons from rolling over and out of synchronization. One of the steel wires (the first steel wire) is hung horizontally by a plurality of vertical stainless steel wires (the second steel wire) with a PVC pipe having a plurality of small holes for irrigating the field, and the other steel wire (the second steel wire) is hung horizontally with a PVC pipe having a plurality of smaller holes in the same way for spraying pesticides.

The water wagon chassis of the disclosure uses two front axles of a medium-sized truck, and each axle is controlled by a hydraulic cylinder with a stroke of three centimeters for steering. Each time it turns for about five degrees, a middle-sized truck differential assembly is used. Each wagon is driven by two three-kilowatt motors to drive a hydraulic oil pump to supply oil to a low-speed and high-torque hydraulic motor to use a triangular belt to drive a transmission shaft of the wagon chassis to move slowly. Two steering travel switches of five centimeters away from each other and about three centimeters away from the ground are arranged below the outer sides of the front and rear of the water wagon. The water wagon is placed on the road iron bar in the middle of the two travel switches, the oil supply of hydraulic throttle valves of the two machines is adjusted to be consistent when walking slowly, the first two steering travel switches are used when walking forward and the last two steering travel switches are powered off, the travel switch on one side touches an iron bar contactor to pull in a hydraulic electromagnetic valve to supply oil to a hydraulic cylinder, a cylinder column extends to make the steering wheel swing, and when the iron bar touches the other travel switch, the electromagnetic valve is powered off, the cylinder column retracts and the wheel swings to the other side. A long water supply pipe buried in the ground extends from one end of a field auxiliary engine from the well, and a faucet connected with a valve is evenly erected every seven meters supplies water to an auxiliary water storage tank. When irrigating the ground, the two water storage tanks are filled to two-thirds full. The counterweight water tank is filled with a little water first, and the water in the two storage tanks will be pumped to an appropriate position in the counterweight water tank while the water storage tank pump is pumping the ground. Due to the gravity of the watering pipe, the water storage tank is equipped with a small amount of water during normal watering. The spraying pipe also sprays water at the same time when watering the ground. The water float switch in the auxiliary water storage tank controls the power on and off of an auxiliary overhead aluminum wire by a water float switch in the auxiliary water storage tank to control the well and the water pump. When pouring the field slowly, when an auxiliary front travel switch touches a vertical water pipe under the faucet (two faucet valves are just below the two manipulators), the self-locking contactors of four motors that control the hydraulic oil pumps of the two water wagons are powered off. The two wagons stop at the same time, and the brake contactors of the two wagons are energized at the same time, the electromagnetic valve supplies oil to the brake cylinder, and the cylinder column stretches out to press the brake master cylinder to complete the brake.

At the same time, four metal sensors mounted on the manipulator align the manipulator fingers with the valve (the front and rear sensors control the forward and reverse rotation of the forward and backward moving motors, and the left and right sensors control the forward and reverse rotation of the left and right moving motors). When the positioning is completed to control the contactors of the forward and backward moving motor are not pulled in, the upper and lower motor contactors are pulled in, and the manipulator is lowered to the appropriate position (at this time, it is controlled by a downward limit proximity switch). When the downward limit proximity switch sends a signal, a rotating motor contactor pulls in a rotating motor to rotate, and when it reaches the limit sensor near the third motor, it stops and the valve opens. At the same time, the limit sensor outputs a signal from the upper and lower motor to an upward limit proximity switch, when up to the upward limit proximity switch, an inverted contactor of the rotating motor turns back to the limit sensor position far away from the third motor. When the current manipulator has completed the valve opening and the later manipulator has completed the valve closing, the upward limit proximity switch outputs a signal to the travel self-locking contactors of the two machines, the hydraulic oil pump motors are turned on, and the two water wagons move forward at the same time. While the front manipulator of the water wagon opens the valve, the rear manipulator closes the other valve in the same way, except that the rotating motor is manually adjusted to the position of the limit sensor near the third motor in advance. When the two water wagons are moving backwards, it is sufficient to manually switch the forward and reverse circuits of the rotating motors of the two manipulators, a rear travel switch in the top view of the main and auxiliary machines is used, and a front travel switch is powered off. Because an iron pipe outside the synchronizer is two meters long, when a gap between conductive copper sheets of a synchronizer of 200 m is adjusted to 1 mm, when 24V direct power attached to the steel wire touches copper sheets behind the auxiliary machine and in front of the main machine if the auxiliary machine is ten centimeters faster than the auxiliary machine, a relay pulls in and cuts off the supply of hydraulic oil. The motor stops, and at the same time the brake electromagnetic valve is energized and the cylinder stretches out to push the brake master cylinder to complete the braking, and the two machines resume moving forward at the same time, until a power copper tube on the steel wire leaves the copper sheet connected with the relay when it is synchronized. When the main machine is ten centimeters faster than the auxiliary machine, the copper sheets connected with the relay at the rear of the main machine and the front of the auxiliary machine touch the power copper tube on the wire, the main machine stops, the two machines resume moving forward at the same time when they are synchronized. When retreating, the wires connecting the front and rear copper sheets of the steel wire to the relay can be converted mutually.

When using the two steering travel switches behind the water wagon, the first two steering travel switches are powered off; a hydraulic electromagnetic valve changes an oil inlet and outlet to control its retreat, and when walking, circuits where the auxiliary machine controls the oil supply to the motor contactor of a hydraulic motor oil pump follow the main engine to work at the same time, and only work separately when they are not synchronized. When the road is uneven, the steel ball in the balancer slides and touches the proximity switch to power off a hydraulic oil pump motor power contactor and a water pump power contactor that are controlled to walk by the two machines to stop working. The same water pump is used for casting and spraying pesticides. When spraying pesticides, a water pipe valve (the first valve) is closed, and pesticides water is dispensed in the middle water tank isolated from the large water tank, and an adjustable throttle valve adjusts the walking speed according to the actual situation.

When the crops are about to germinate and become mildewed in continuous rainy weather, the dryer is disposed on two load steel wires with hoists in the middle through a pulley hoisting ring, and moved slowly by a pulling motor with an electromagnetic clutch at each end for drying. The electromagnetic clutch is pulled in when one end is pulled, and the electromagnetic clutch at the other end is de-energized and opened, the two water wagons are moved when the other row is dried.

When the crops are about to germinate and become mildewed in continuous rainy weather, the dryer is mount on two load steel wires with hoists in the middle through a pulley hoisting ring, and move slowly by a pulling motor with an electromagnetic clutch at each end for drying. The electromagnetic clutch is pulled in when one end is pulled, and the electromagnetic clutch at the other end is de-energized and opened, the two water wagons are moved when the other row is dried. When crops such as watermelon, eggplant, cucumber, beans, and tomatoes are grown in the field, and the truck cannot be driven into the field, it is transported from one end to the other end by using the hanging basket described in the disclosure. When it is necessary to do farm work in the field in summer, the rain shelter can be mounted to block strong light and light rain to avoid getting wet.

The device of the disclosure is also equipped with a wind control switch. When the wind speed is greater than five levels, the two machines automatically stop to avoid accidents.

In summary, the disclosure can effectively reduce and avoid economic losses caused by the natural environment, and can also effectively reduce labor and labor intensity, save costs, and increase economic income. The disclosure has a high degree of automation, multi-functionality and simple operation.

The above is only the preferred embodiment of the disclosure and is not intended to limit the disclosure. Any modifications, equivalent replacements, improvements and the like made within the spirit and principle of the disclosure shall fall within the scope of protection of the disclosure.

What is claimed is:

1. A multi-functional automatic translational field service device, comprising a first driverless water wagon and a second driverless water wagon, the first driverless water wagon and the second driverless water wagon are arranged on a flat road at two ends of a field respectively, wherein the first driverless water wagon is connected with the second driverless water wagon through a first steel wire (1) and a second steel wire (2), and two sides of the first steel wire (1) are each provided with a synchronizer (3); the first steel wire (1) is connected with a first horizontal PVC pipe (5) through a plurality of third steel wires (4), the plurality of third steel wires (4) are evenly distributed and extended along a vertical direction; a plurality of first round holes are evenly distributed on the first PVC pipe (5); the second steel wire (2) is connected with a second horizontal PVC pipe (7) through a plurality of fourth steel wires (6), the plurality of fourth steel wires (6) are evenly distributed and extended along the vertical direction; a plurality of second round holes are evenly distributed on the second PVC pipe (7); each of the first driverless water wagon and the second driverless water wagon comprises a water wagon chassis; the water wagon chassis is provided with a hydraulic oil tank (53), a balancer (54), a water storage tank (19) and a first support (25) respectively; a hydraulic motor (14) is connected with the hydraulic oil tank (53); one side of the first support (25) is connected with a counterweight water tank (26) through a pulling water tank steel wire; the water storage tank (19) is disposed on the other side of the first support (25); the water wagon chassis is provided with a distribution box (28); the water wagon chassis is provided with an overhead aluminum wire (29) on a side of the counterweight water tank (26); both ends of the overhead aluminum wire (29) are connected with wire rods (31) through overhead aluminum wire supports (30) respectively; a wiping overhead wire support assembly (32) is connected with the overhead aluminum wire (29); the wiping overhead wire support assembly (32) is connected with the distribution box (28) through a first cable; the distribution box (28) on the first driverless water wagon is connected with the distribution box (28) on the second driverless water wagon through a second cable (33); an end of the overhead aluminum wire (29) on a side of the second driverless water wagon is connected with a first water pump in a well (35) through a water pump wire (34); the first water pump is connected with the water storage tank (19) on the second driverless water wagon through a water inlet pipe (36); a front side of the water storage tank (19) on the second driverless water wagon is connected with a second water pump (41); an upper end of the second water pump (41) is connected with a first valve (42) and a second valve (43) respectively; the first valve (42) is connected with the first PVC pipe (5), and the second valve (43) is connected with the second PVC pipe (7); a front end and a rear end of the water wagon chassis on the second driverless water wagon both are connected with a valve switch manipulator (38) through a manipulator support (37); and the front end and the rear end of one side of the second driverless water wagon both are connected with a travel switch (91) through a travel switch support (92).

2. The multi-functional automatic translational field service device according to claim 1, wherein the valve switch manipulator (38) comprises a base; a first motor (39) is mounted on the base; a first gear (51) on the first motor (39) is connected with a first platform through a first rack (40); a plurality of first bearings (52) are disposed at a connection between the first platform and the base; a second motor (73) is mounted on the first platform; a second gear (74) on the second motor (73) is connected with a second platform through a second rack (75); a plurality of second bearings (76) are disposed at a connection between the second platform and the first platform; a rotating motor (77) is mounted on the second platform through a rotating motor support (85); one side of the rotating motor (77) is connected with a third rack (78) through a first iron block (81); the third rack (78) is connected with a third motor (80) through a third gear (79); the other side of the rotating motor (77) is connected with a sliding block (84) on a track (83) through a second iron block (82); four positioning metal sensors (86) are evenly mounted on the second platform along the circumference of the rotating motor (77); a rotor of the rotating motor (77) is connected with a manipulator finger (87); a downward limit proximity switch (88) is mounted on one side of the manipulator finger (87); an induced iron bar (93) is mounted on the other side of the manipulator finger (87); both a left side and a front side of the rotating motor (77) are provided with a limit sensor (89); and the limit sensor (89) is mounted on the second platform through a limit sensor support (58).

3. The multi-functional automatic translational field service device according to claim 1, wherein the first support (25) is connected with a second support (20) through a third support (24); a pulling motor (21) is disposed in a middle of the second support (20); an electromagnetic clutch (23) is disposed on the pulling motor (21); and a hoist (22) is disposed on a top of the second support (20).

4. The multi-functional automatic translational field service device according to claim 1, wherein the water wagon chassis comprises a plurality of front axles (8) and a differential (9); both left and right ends of each front axle (8) in the plurality of front axles (8) are provided with a first wheel (10); the each front axle (8) is connected with a steering rod (12) of a steering hydraulic cylinder (11); the differential (9) is connected with a hydraulic motor (14) through a transmission shaft (13); both left and right ends of the differential (9) are provided with a plurality of second wheels (15); the second wheels (15) on left and right sides of the differential (9) are connected with a brake pull rod (17) of a brake hydraulic cylinder (16); and upper and lower sides of the water wagon chassis are provided with a steering travel switch (18) respectively.

5. The multi-functional automatic translational field service device according to claim 1, wherein a dryer is disposed between a pulling motor (21) on the first driverless water wagon and a pulling motor (21) on the second driverless water wagon, a plurality of steel wires penetrate through an upper end of the dryer, one end of each steel wire in the plurality of steel wires is connected with a hoist (22) on the first driverless water wagon, the other end of the each steel wire is connected with a hoist (22) on the first driverless water wagon, the dryer is connected with the distribution box (28) through a third cable (71), and the dryer comprises tungsten wires (59) evenly distributed and extended vertically and a plurality of rows of dryer fans (60) evenly distributed.

6. The multi-functional automatic translational field service device according to claim 5, wherein the dryer is replaced with a hanging basket or a rain shelter, the rain shelter comprises a reinforcing mesh support (61), the reinforcing mesh support (61) is provided with a film (62), a sunscreen (63) is disposed above the film (62), and two upper ends of the reinforcing mesh support (61) are provided with a connecting ring (64) respectively.

7. The multi-functional automatic translational field service device according to claim 4, wherein the water wagon chassis is also provided with a counterweight iron plate (27), and there are two front axles (8) and two second wheels (15).

8. The multi-functional automatic translational field service device according to claim 1, wherein the synchronizer (3) comprises an insulating plastic sleeve (44); an outer side of the insulating plastic sleeve (44) is sleeved with a conductive copper tube (45); both sides of the conductive copper tube (45) are provided with contactor copper sheets (46); the contactor copper sheet (46) is connected with a plastic block (48) through an first insulating screw (47); the plastic block (48) is connected with a second steel pipe (70) through a second insulating screw (49); and the contactor copper sheet (46) is connected with the second steel pipe (70) through a plastic screw (50).

9. The multi-functional automatic translational field service device according to claim 1, wherein the hydraulic oil tank (53) is provided with a hydraulic electromagnetic valve (55), a hydraulic oil pump (56), a motor (57), and a motor oil pump (69) respectively, wherein the hydraulic oil pump (56) is connected with the motor (57).

10. The multi-functional automatic translational field service device according to claim 1, wherein the balancer (54) comprises a proximity switch (65), a first steel pipe is sleeved in a middle of the proximity switch (65), the first steel pipe (66) is provided with a steel ball (67), and a lower part of the first steel pipe (66) is provided with a plurality of screws (68).

* * * * *